United States Patent
Wu

(10) Patent No.: US 7,702,812 B2
(45) Date of Patent: Apr. 20, 2010

(54) ADDRESS ALLOCATION SYSTEM AND METHOD

(75) Inventor: Tung-Kun Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 744 days.

(21) Appl. No.: 11/309,587

(22) Filed: Aug. 26, 2006

(65) Prior Publication Data

US 2007/0283332 A1    Dec. 6, 2007

(30) Foreign Application Priority Data

Jun. 2, 2006    (TW) .............................. 095119636

(51) Int. Cl.
G06F 15/16    (2006.01)

(52) U.S. Cl. ..................................................... 709/245

(58) Field of Classification Search ................ 709/231, 709/245; 707/1; 370/309
See application file for complete search history.

(56) References Cited

U.S. PATENT DOCUMENTS

| 2002/0065806 A1* | 5/2002 | Kim ............................ 707/1 |
| 2003/0012225 A1 | 1/2003 | Banerjee et al. |
| 2003/0179750 A1* | 9/2003 | Hasty et al. ................ 370/390 |

* cited by examiner

Primary Examiner—Thu Nguyen
Assistant Examiner—Patrick Vassall
(74) Attorney, Agent, or Firm—Wei Te Chung

(57) ABSTRACT

An address allocation system including a client and a server is provided. The server includes a setting module, a detecting module, and a converting module. The setting module is for setting a filtering code. The detecting module is for detecting whether a physical-layer address of the client corresponds to the filtering code. The converting module is for converting the physical-layer address into a network-layer address if the physical-layer address corresponds to the filtering code, and for allocating the network-layer address to the client. An address allocation method is also provided.

20 Claims, 2 Drawing Sheets

ADDRESS ALLOCATION SYSTEM AND METHOD

FIELD OF THE INVENTION

The invention generally relates to a system and method, and particularly to an address allocation system and method.

DESCRIPTION OF RELATED ART

Dynamic host configuration protocol (DHCP) is a popular method for allocating internet protocol (IP) addresses dynamically to hosts by a DHCP server. Test engineers may make use of allocated IP addresses to test the hosts in a network. To determine IP addresses of the hosts, engineers first read medium access control (MAC) addresses thereof, and then inquire of a mapping table in the DHCP server. The mapping table indicates a relationship between the MAC addresses of the hosts and the IP addresses thereof. However, in a network environment having a plurality of hosts, an inquiry process is time-consuming and inefficient.

SUMMARY OF THE INVENTION

An address allocation system including a client and a server is provided. The server includes a setting module, a detecting module, and a converting module. The setting module is for setting a filtering code. The detecting module is for detecting whether a physical-layer address of the client corresponds to the filtering code. The converting module is for converting the physical-layer address into a network-layer address if the physical-layer address corresponds to the filtering code, and for allocating the network-layer address to the client.

An address allocation method is also provided. The address allocation method includes: setting a filtering code by the server; sending an allocation request packet to the server, the address allocation request comprising a physical-layer address of the client; detecting whether the physical-layer address corresponds to the filtering code by the server; and converting the physical-layer address into a network-layer address if the physical-layer address corresponds to the filtering code by the server.

Other advantages and novel features will become more apparent from the following detailed description when taken in conjunction with the accompanying drawings, in which:

DETAILED DESCRIPTION OF THE INVENTION

Figure 1:
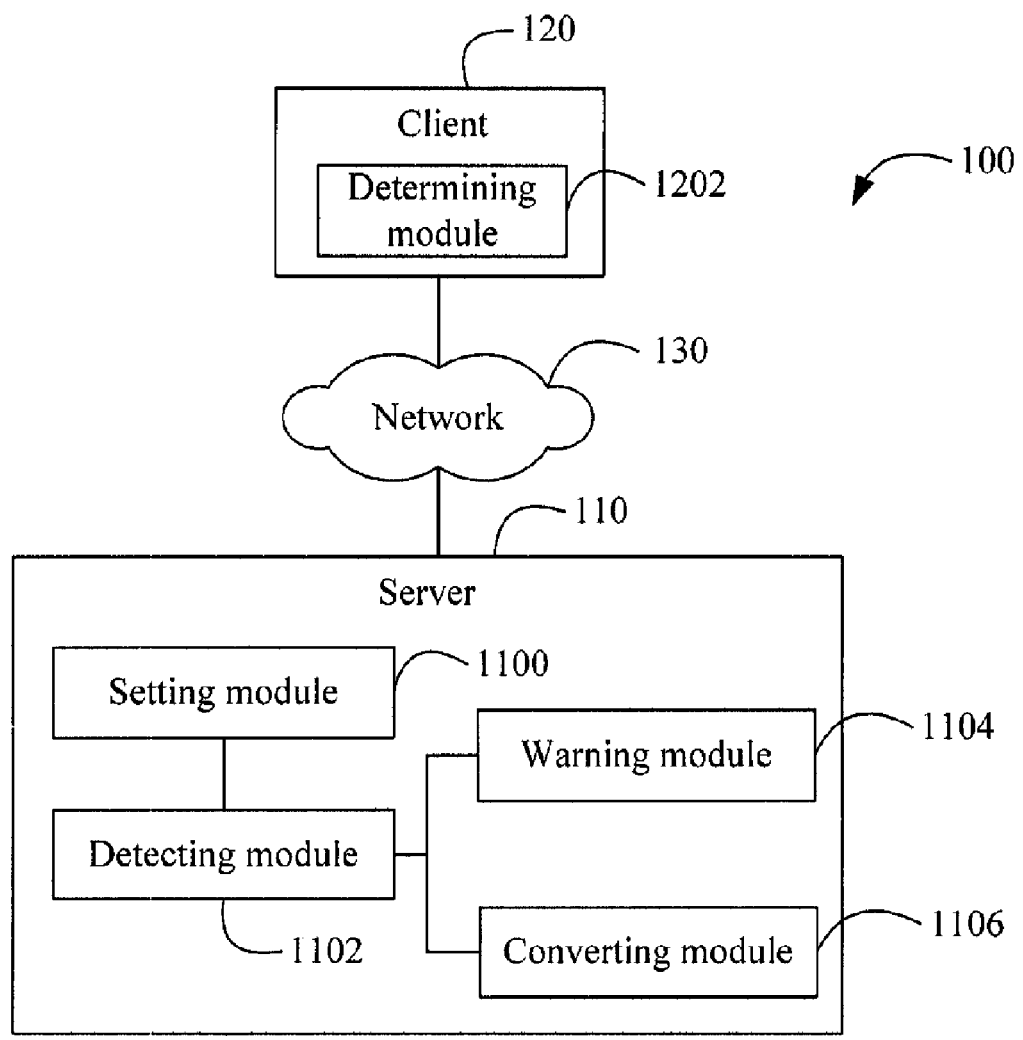
FIG. 1 is a diagram of a system architecture of an address allocation system of an exemplary embodiment of the invention.

FIG. 1 is a diagram of a system architecture of an address allocation system 100 of an exemplary embodiment of the invention.

The address allocation system 100, applicable to a communication system, includes a server 110 and a client 120. The server 110 is connected to the client 120 via a network 130, and the server 110 is able to allocate an address to the client 120 via a dynamic host configuration protocol (DHCP). In this embodiment, the server 110 is a personal computer (PC), the client 120 is a network device such as a modem, a switch, and the like, and the network 130 is an Ethernet network.

The server 110 includes a setting module 1100, a detecting module 1102, a warning module 1104, and a converting module 1106. The client 120 includes a determining module 1202.

The setting module 1100 is for setting a filtering code. In this embodiment, the filtering code comprises a six-digit code 000123.

The detecting module 1102 detects whether a physical-layer address of the client 120 corresponds to the filtering code. In this embodiment, the physical-layer address includes a medium access control (MAC) address. The detecting module 1102 determines whether first six digits of the physical-layer address match with the filtering code 000123. If the first six digits of the physical-layer address match with the filtering code, the client 120 is qualified for requesting the server 110 to allocate an address. If the first six digits of the physical-layer address do not match with the filtering code, the client 120 is unqualified for requesting the server 110 to allocate the address.

The warning module 1104 sends warning messages. In this embodiment, when the detecting module 1102 detects the first six digits of the physical-layer address do not match with the filtering code, the warning module 1104 sends the warning message to a display (not shown) to alert an operator of the server 110.

The converting module 1106 converts the physical-layer address into a network-layer address, and allocates the network-layer address to the client 120. In this embodiment, the network-layer address is an Internet protocol (IP) address.

The physical-layer address is composed of twelve hexadecimal numbers, of which the first digit and the second digit form a first pair of numbers, the third digit and the fourth digit form a second pair of numbers, and so on. The converting module 1106 converts the first pair of numbers, the second pair of numbers, and the third pair of numbers into a randomly selected number ranging from 0 to 255, the number being a first part of the network-layer address. The converting module 1106 then respectively converts the fourth pair of numbers, the fifth pair of numbers, and the sixth pair of numbers into a second part, a third part, and a fourth part of the network-layer address, based on a rule of converting a hexadecimal number into a decimal equivalent.

For example, if the physical-layer address of the client 120 is 00:01:23:11:00:EF, the converting module 1106 arbitrarily changes 00:01:23 into a number 168, and then respectively converts hexadecimal numbers 11, 00 and EF into decimal numbers 17, 0, and 239. As a result, the network-layer address becomes 168.17.0.239.

The determining module 1202 determines whether to receive the network-layer address. In detail, the determining module 1202 sends an address resolution protocol (ARP) packet to the network 130 to determine whether there is another client 120 allocated the same network-layer address, thereby avoiding an address conflict.

Figure 2:
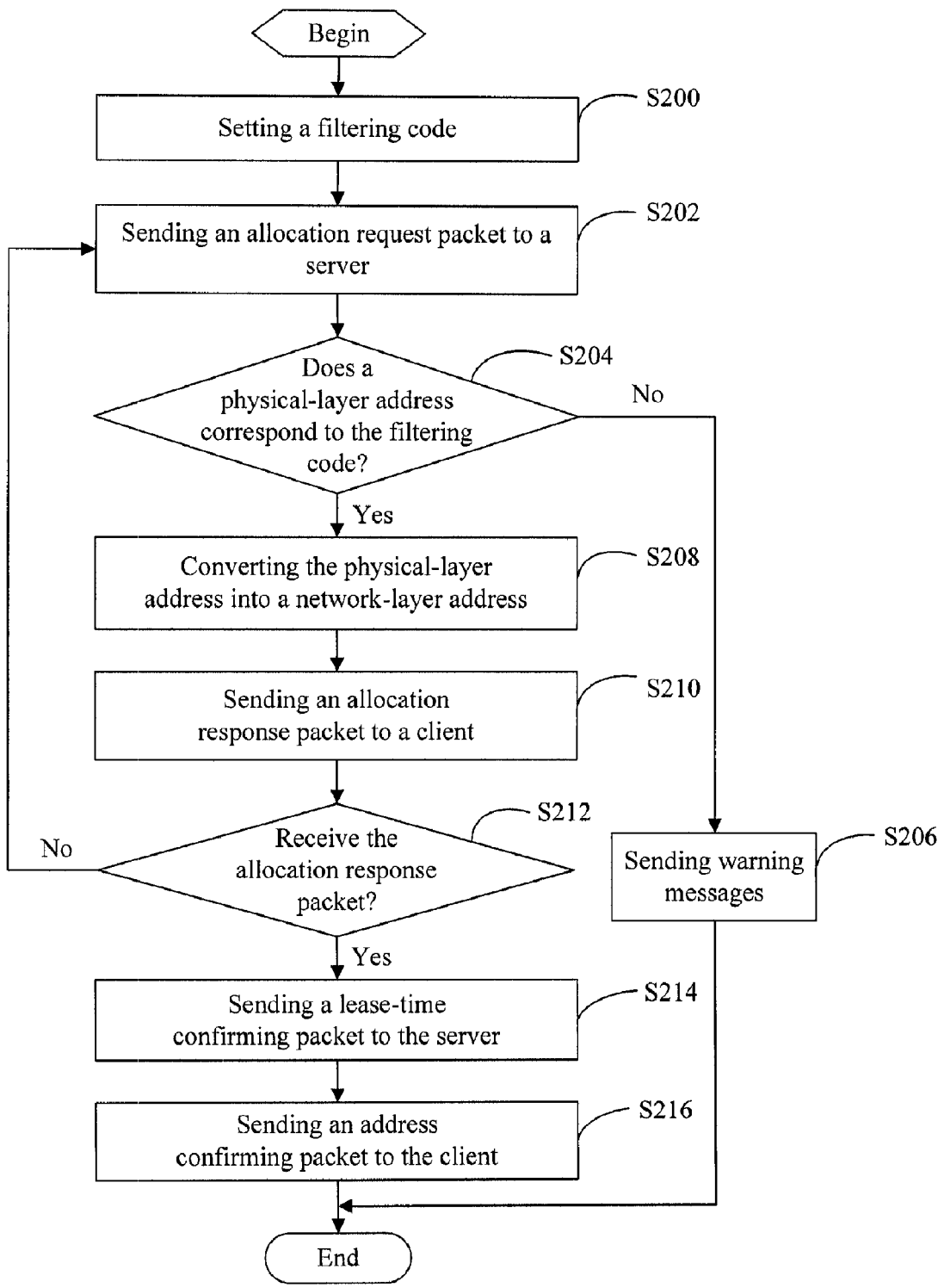
FIG. 2 is a flowchart of an address allocation method of another embodiment of the invention.

FIG. 2 is a flowchart of an address allocation method of another embodiment of the invention.

In step S200, the setting module 1100 sets the filtering code.

In step S202, the client 120 sends an allocation request packet to the server 110. In this embodiment, the allocation request packet is a DHCP Discover packet, and includes the physical-layer address of the client 120.

In step S204, the detecting module 1102 determines whether the physical-layer address corresponds to the filtering code. If the physical-layer address does not correspond to the filtering code, the process proceeds to step S206. If the physical-layer address corresponds to the filtering code, the process proceeds to step S208.

In step S206, the warning module 1104 sends the warning messages to the display.

In step S208, the converting module 1106 converts the physical-layer address into the network-layer address if the physical-layer address corresponds to the filtering code. As described above, The converting module 1106 converts the first pair of numbers, the second pair of numbers, and the third pair of numbers into a randomly selected number ranging from 0 to 255, the number being the first part of the network-layer address. The converting module 1106 then converts the fourth pair of numbers, the fifth pair of numbers, and the sixth pair of numbers into the second part, the third part, and the fourth part of the network-layer address, respectively, based on a rule of converting a hexadecimal number into a decimal equivalent.

In step S210, the server 110 sends an allocation response packet to the client 120. In this embodiment, the allocation response packet is a DHCP Offer packet, and includes the network-layer address and a lease time thereof.

In step S212, the determining module 1202 determines whether to receive the allocation response packet. If the determining module 1202 determines not to receive the allocation response packet, the process returns to step S202. If the determining module 1202 determines to receive the allocation response packet, the process proceeds to step S214.

In step S214, the client 120 sends a lease-time confirming packet to the server 110. In this embodiment, the lease-time confirming packet includes a DHCP request packet, and informs the server 110 that the client 120 accepts the lease-time provided by the server 110.

In step S216, the server 110 sends an address confirming packet to the client 120. In this embodiment, the address confirming packet is a DHCP ACK packet, and informs the client 120 that the client 120 may use the network-layer address.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An address allocation system, comprising:
   a client; and
   a server, comprising:
   a setting module for setting a filtering code, the filtering code comprising a six-digit code;
   a detecting module for detecting whether a physical-layer address of the client corresponds to the filtering code; and
   a converting module for converting the physical-layer address into a network-layer address if the physical-layer address corresponds to the filtering code, and for allocating the network-layer address to the client.

2. The address allocation system in accordance with claim 1, wherein the client comprises a determining module for determining whether to receive the network-layer address.

3. The address allocation system in accordance with claim 1, wherein the server further comprises a warning module for sending warning messages to a display of the server if the physical-layer address does not correspond to the filtering code.

4. The address allocation system in accordance with claim 1, wherein the client comprises a network device.

5. The address allocation system in accordance with claim 1, wherein the server comprises a dynamic host configuration protocol (DHCP) server.

6. The address allocation system in accordance with claim 1, wherein the physical-layer address comprises a medium access control (MAC) address.

7. The address allocation system in accordance with claim 1, wherein the network-layer address comprises an Internet protocol (IP) address.

8. The address allocation system in accordance with claim 1, wherein the physical-layer address is composed of twelve hexadecimal numbers, and the detecting module determines whether the first six digits of the physical-layer address match with the filtering code.

9. The address allocation system in accordance with claim 8, wherein the converting module converts the first six digits of the physical-layer address into a randomly selected number ranging from 0 to 255, being a first part of the network-layer address, and converts the seventh and the eighth digits, the ninth and the tenth digits, and the eleventh and the twelfth digits of the physical-layer address into a second part, a third part, and a fourth part of the network-layer address respectively based on a hexadecimal number into decimal number equivalent conversion rule.

10. An address allocation method applicable to an address allocation system comprising a client and a server, the address allocation method comprising:
    setting a filtering code by the server, the filtering code comprising a six-digit code;
    sending an allocation request packet from the client to the server, the address allocation request comprising a physical-layer address of the client;
    detecting whether the physical-layer address corresponds to the filtering code by the server; and
    converting the physical-layer address into a network-layer address if the physical-layer address corresponds to the filtering code by the server.

11. The address allocation method in accordance with claim 10, further comprising a step of sending warning messages to a display of the server by a warning module of the server if the physical-layer address does not correspond to the filtering code.

12. The address allocation method in accordance with claim 11, further comprising a step of sending an allocation response packet to the client by the server.

13. The address allocation method in accordance with claim 12, wherein the allocation response packet comprises a network-layer address converted by the server, and a lease time of the network-layer address.

14. The address allocation method in accordance with claim 12, further comprising a step of determining whether the client receives the allocation response packet.

15. The address allocation method in accordance with claim 14, further comprising a step of sending a lease-time confirming packet to the server by the client if the client accepts the allocation response packet.

16. The address allocation method in accordance with claim 15, further comprising a step of sending an address confirming packet to the client by the server after the server receives the lease-time confirming packet to confirm the client may use the network-layer address.

17. The address allocation method in accordance with claim 10, wherein detecting whether the physical-layer address corresponds to the filtering code by the server comprises determining whether the first six digits of the physical-layer address composed of twelve hexadecimal numbers match with the filtering code.

18. The address allocation method in accordance with claim 17, wherein converting the physical-layer address into a network-layer address comprises:
    converting the first six digits of the physical-layer address into a randomly selected number ranging from 0 to 255, being a first part of the network-layer address; and
    converts the seventh and the eighth digits, the ninth and the tenth digits, and the eleventh and the twelfth digits of the physical-layer address into a second part, a third part, and a fourth part of the network-layer address respectively based on a hexadecimal number into decimal number equivalent conversion rule.

19. A method to allocate addresses in an address allocation system, comprising the steps of:
  requesting address allocation for a client of an address allocation system by means of sending an allocation request packet comprising a physical-layer address of said client therein from said client to an address allocation server of said address allocation system;
  detecting whether said physical-layer address corresponds to a filtering code comprising a six-digit code; and
  allocating said physical-layer address to said client for being used as an applicable network-layer address by means of converting said physical-layer address to said applicable network-layer address if said physical-layer address corresponds to said filtering code.

20. The method in accordance with claim 19, wherein said physical-layer address is converted to said applicable network-layer address by a rule of converting a hexadecimal number into a decimal equivalent.

* * * * *